UNITED STATES PATENT OFFICE.

WILLIAM C. WETHERILL, OF CANON CITY, COLORADO, ASSIGNOR TO THE EMPIRE ZINC COMPANY, OF DENVER, COLORADO, A CORPORATION OF COLORADO.

PROCESS OF TREATING COMPLEX ORES OF ZINC.

SPECIFICATION forming part of Letters Patent No. 724,637, dated April 7, 1903.

Application filed June 23, 1902. Serial No. 112,936. (No specimens.)

*To all whom it may concern:*

Be it known that I, WILLIAM C. WETHERILL, a citizen of the United States, residing at Canon City, in the county of Fremont and State of Colorado, have invented certain new and useful Improvements in Processes of Treating Complex Ores of Zinc; and I do hereby declare the following to be a full, clear, and exact description of the invention, such as will enable others skilled in the art to which it appertains to make and use the same.

My invention relates to the treatment of ores whose main metallic constituent is zinc, with which is associated varying, but important, quantities of the precious metals, such as gold or silver, and perhaps others, as copper and lead, which it is desirable to save, but for whose recovery, so far as I am aware, no commercial process has heretofore been available. Ores of this general character are found, for instance, in Colorado and others of the Western States. In most cases the greater part of the precious metals is removable, together with almost all of the lead, copper, and iron, in the preliminary milling operations to which the complex ores are subjected in order to isolate, as far as possible, the zinc-bearing constituent from them. In other instances a large portion of the gold and silver and of the other associated metals remains with the zinc, the preliminary separation attempted being insufficient for that purpose. My process is applicable, therefore, to the treatment of zinc-bearing ores wherever associated with the metals referred to, even though the percentage of gold and silver may vary within comparatively wide limits.

Inasmuch as the zinc-bearing ores of the kind mentioned generally contain sulfur, I first roast the ore for the purpose of removing as much of the sulfur as is possible. I then mix the ore with from forty to sixty per cent. of carbon in the form of coal or coke and subject the mixture to heat in closed retorts for the purpose of reducing the zinc ore and distilling the zinc off into suitable zinc-collecting condensers. Inasmuch as air is excluded from the closed retorts, it follows that only a portion of the carbon is fully consumed, the resulting mass of residuum being from fifty to seventy-five per cent., by weight, of the original calcined ore treated. In this residuum are contained the precious metals originally present in the ore, together with such other metals as are usually associated therewith in greater or lesser quantity—as, for instance, copper and lead. There is also necessarily present in spite of the best preliminary separation possible considerable slag or gangue and considerable silica, all of which interferes with the metallurgy of the residuum for the recovery of the precious metals by any of the usual processes. I have discovered, however, that by so apportioning the charge of zinc ores that they shall contain a certain minimum quantity of iron or by adding sufficient iron for the purpose the precious metals and some other metals, if present, will become so associated or combined with the iron as to form particles which are susceptible to the attraction of a suitable magnetic field—such, for instance, as that developed by the well-known magnetic separators of the Wetherill type. The amount of iron thus apportioned to the charge in order to come within my invention must be sufficient to render the precious metals ultimately associated therewith in the residuum susceptible to magnetic attraction and must not be so great as to unduly attack the retort-bottoms during the zinc-distilling operation. In general the amount of iron thus apportioned to the charge should not exceed thirteen per cent., by weight, of the calcined ore charged, because of the destructive effects of a larger proportion of iron upon the retort-bottoms. In further pursuance of my process I crush the furnace residuum and size it through a ten or twenty mesh screen, according to the nature of the material. The resultant product I again screen dry through a forty to sixty mesh screen, and even further, should the nature of the ore require it. Each of the sizes thus obtained is passed through a Wetherill or similar magnetic separator having a capacity for obtaining accurate adjustment of the magnetic field of force to suit the material treated, whereupon I find that the values are sufficiently magnetizable to be separated from the mass as pole products or heads. It will of course be understood that the same material may be passed through any suitable number of magnetic separators of the type referred to to insure as complete a separation as is desired or feasible. The heads or pole products obtained are thus practically freed from the remainder of the residuum and are concentrated to a degree sufficient to permit their economical shipment to and treatment by smelting and refining works. The remaining material—as, for instance, particles of zinc, ash, silica, and unconsumed coal—passes off as tailings and may be subjected to a rough wet concentration, so as to separate the unconsumed coal in a state sufficiently clean for further use.

Having thus described my invention, what I claim is—

1. The method of recovering the precious metals and other valuable metals from zinc-bearing ores with which they are associated, which consists in apportioning to or associating with such ores a sufficient quantity of iron to ultimately render the said metals (by the resulting combination) susceptible to magnetic separation, then reducing and distilling off the zinc by the aid of an excess of carbon in a closed retort, thereby producing a carbonaceous residuum containing iron in association with the said metals to a degree sufficient to render the latter magnetic, crushing the residuum, and separating the magnetizable precious and other valuable metals therefrom by magnetic attraction; substantially as described.

2. The method of recovering the precious metals and other valuable metals from zinc-bearing ores with which they are associated, which consists in apportioning to or associating with such ores a sufficient quantity of iron to ultimately render the said metals (by the resulting combination) susceptible to magnetic separation, then reducing and distilling off the zinc by the aid of an excess of carbon in a closed retort, thereby producing a carbonaceous residuum containing iron in association with the said metals to a degree sufficient to render the latter magnetic, crushing the residuum, separating the magnetizable precious and other valuable metals therefrom by magnetic attraction, and subsequently concentrating out the carbon from said residuum; substantially as described.

In testimony whereof I affix my signature in presence of two witnesses.

WILLIAM C. WETHERILL.

Witnesses:
HELEN B. YOUNKIN,
HENRY E. WOOD.